United States Patent [19]

Kazahaya et al.

[11] 4,030,366

[45] June 21, 1977

[54] PRESSURE TRANSMITTER

[75] Inventors: Masahiro Kazahaya, Southampton; John J. Bonner, Philadelphia, both of Pa.

[73] Assignee: Fischer & Porter Co., Warminster, Pa.

[22] Filed: Aug. 11, 1976

[21] Appl. No.: 713,623

[52] U.S. Cl. ............................... 73/406; 73/398 R
[51] Int. Cl.² .............................. G01L 7/08
[58] Field of Search ............ 73/406, 407 BN, 408, 73/388 R, 398 R, 398 C, 398 AR; 92/94, 99

[56] References Cited

UNITED STATES PATENTS

| 63,648 | 4/1867 | Matthews | 73/408 |
|---|---|---|---|
| 2,297,679 | 10/1942 | Allen | 73/408 |
| 2,312,787 | 3/1943 | Allen | 73/406 |

*Primary Examiner*—Donald O. Woodiel

[57] ABSTRACT

A pressure transmitter for sensing fluidic pressure to produce an indication that is converted into a signal for transmission to a remote station. The transmitter includes a sensor constituted by a diaphragm which seals a chamber in a meter body subject to fluid pressure, the diaphragm being axially dilated in accordance with the applied pressure. Anchored on the diaphragm is an upstanding force beam which is pushed thereby in the axial direction. A range spring which is offset with respect to the axis of the beam is connected between an intermediate point on the beam and the meter body. The spring acts to constrain axial motion of the beam, whereby when the diaphragm is dilated by fluidic pressure, the beam is caused to deflect to an extent determined thereby. A motion detector is operatively coupled to the upper end of the beam to convert the deflection thereof into a corresponding signal for transmission.

7 Claims, 4 Drawing Figures

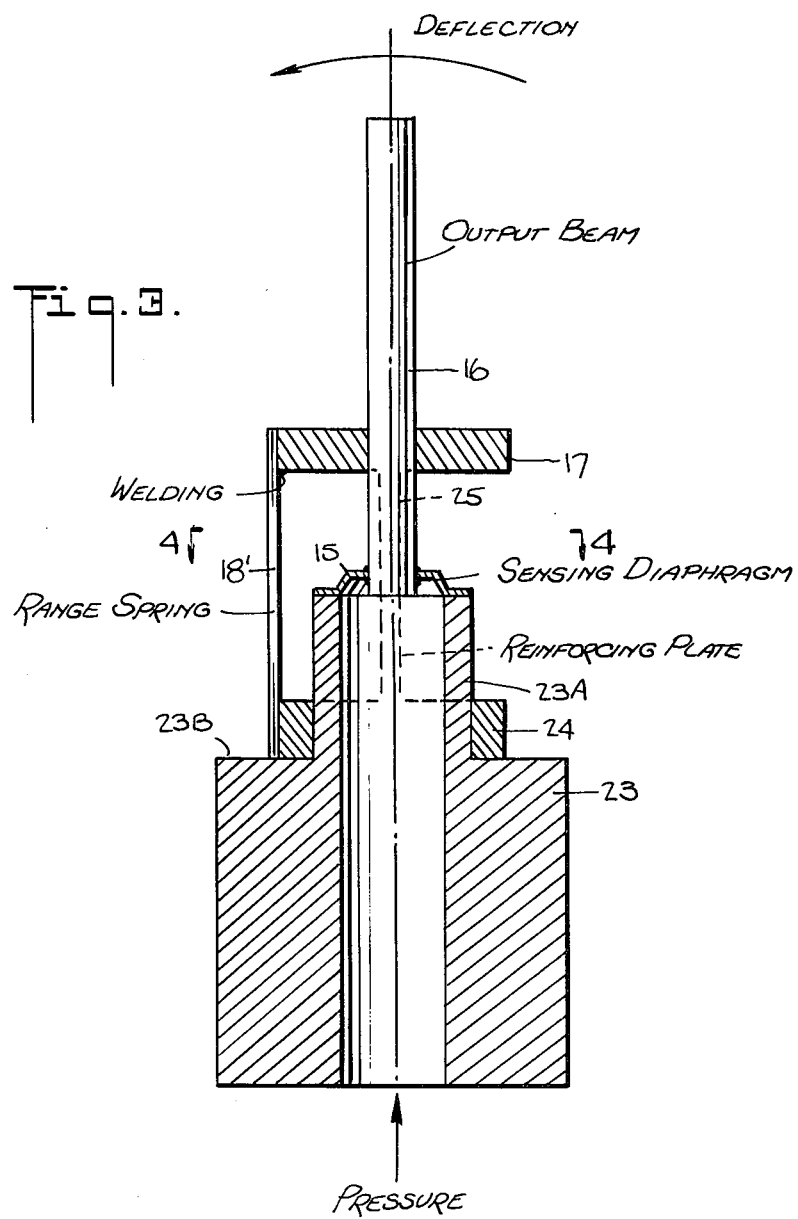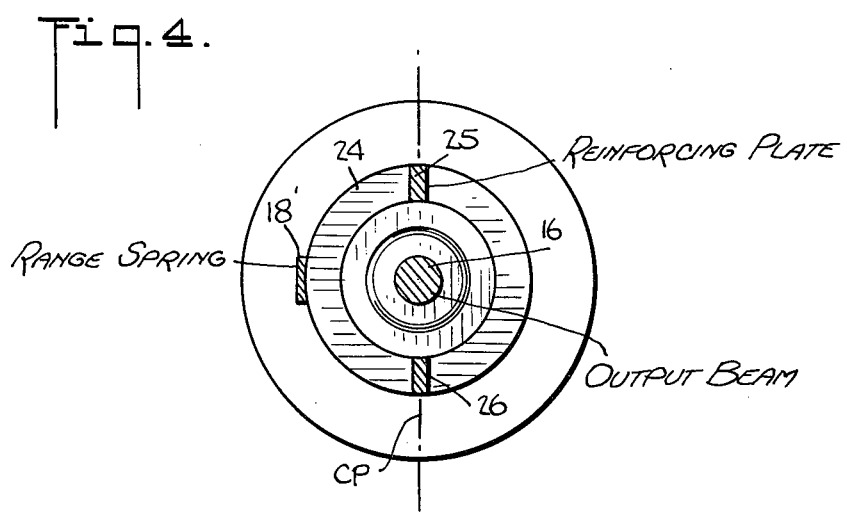

PRESSURE TRANSMITTER

BACKGROUND OF INVENTION

This invention relates generally to pressure transmitters adapted to convert fluid pressure into a corresponding pneumatic or electrical signal, and more particularly to a transmitter that includes a pressure sensor in which the fluid to be metered is applied to a sealing diaphragm on which a force beam is mounted to deflect the beam.

In many industrial process control systems, there is a need to measure a variable fluid pressure and to convert the measurement into a signal for transmission to a remote station for operating indicator or control equipment. In one known form of pressure transmitter for this purpose, a sealing diaphragm is fixed about a high pressure opening and a force beam is mounted thereon. Flexures are provided for absorbing axial thrust of the diaphragm, these flexures being offset from the longitudinal axis of the beam so that the beam is angularly responsive to diaphragm expansion.

In a pressure sensor it is important to be able to vary the operating range of the instrument without altering its static balance. Known arrangements are incapable of making this adjustment, and the range of these instruments is limited by the characteristics of the diaphragm and of the flexures associated with the beam.

SUMMARY OF INVENTION

In view of the foregoing, it is the main object of this invention to provide an improved pressure transmitter in which torque is applied directly to a force beam by a sealing diaphragm and in which a range spring is associated with the beam of an offset position to cause deflection thereof within a desired range.

More particularly, it is an object of this invention to provide an improved pressure transmitter in which a force beam sensor operates in conjunction with a motion detector responsive to the deflection of the beam to produce a pneumatic or electrical signal proportional to the applied pressure.

Also an object of the invention is to provide a pressure sensor of the above-type in which the force beam is mouned above a sealing diaphragm. The sensor being operable in a high pressure range without causing permanent deformation of the diaphragm.

A salient feature of a pressure sensor in accordance with the invention is that it is of simple and rugged design, yet it is highly accurate, and lends itself to low-cost manufacture.

Briefly stated, these objects are attained in a pressure transmitter which includes a sensor constituted by a diaphragm which seals a pressure chamber in a meter body subject to fluid pressure, the diaphragm being axially dilated in accordance with the applied pressure.

Anchored on the diaphragm is an upstanding force beam which is pushed thereby in the axial direction. Connected between one side of a bracket secured to the beam of an intermediate point thereon and the meter body is a range spring which is offset with respect to the axis of the beam, the spring acting to constrain axial motions of the beam whereby when the diaphragm is dilated by fluidic pressure, the beam is then caused to deflect to an extent determined thereby.

Operatively coupled to the upper end of the beam is an open-loop or closed loop motion detector to convert the deflection thereof into a corresponding pneumatic or electrical signal suitable for transmission to a remote point.

OUTLINE OF THE DRAWINGS

For a better understanding of the invention as well as other objects and further features thereof, reference is made to the following detailed description to be read in conjunction with the accompanying drawings, wherein:

FIG. 3 is a longitudinal section taken through a second embodiment of a pressure sensor; and FIG. 4 is a plan view of the sensor shown in FIG. 3.

DESCRIPTION OF INVENTION

First Embodiment

Figure 1:
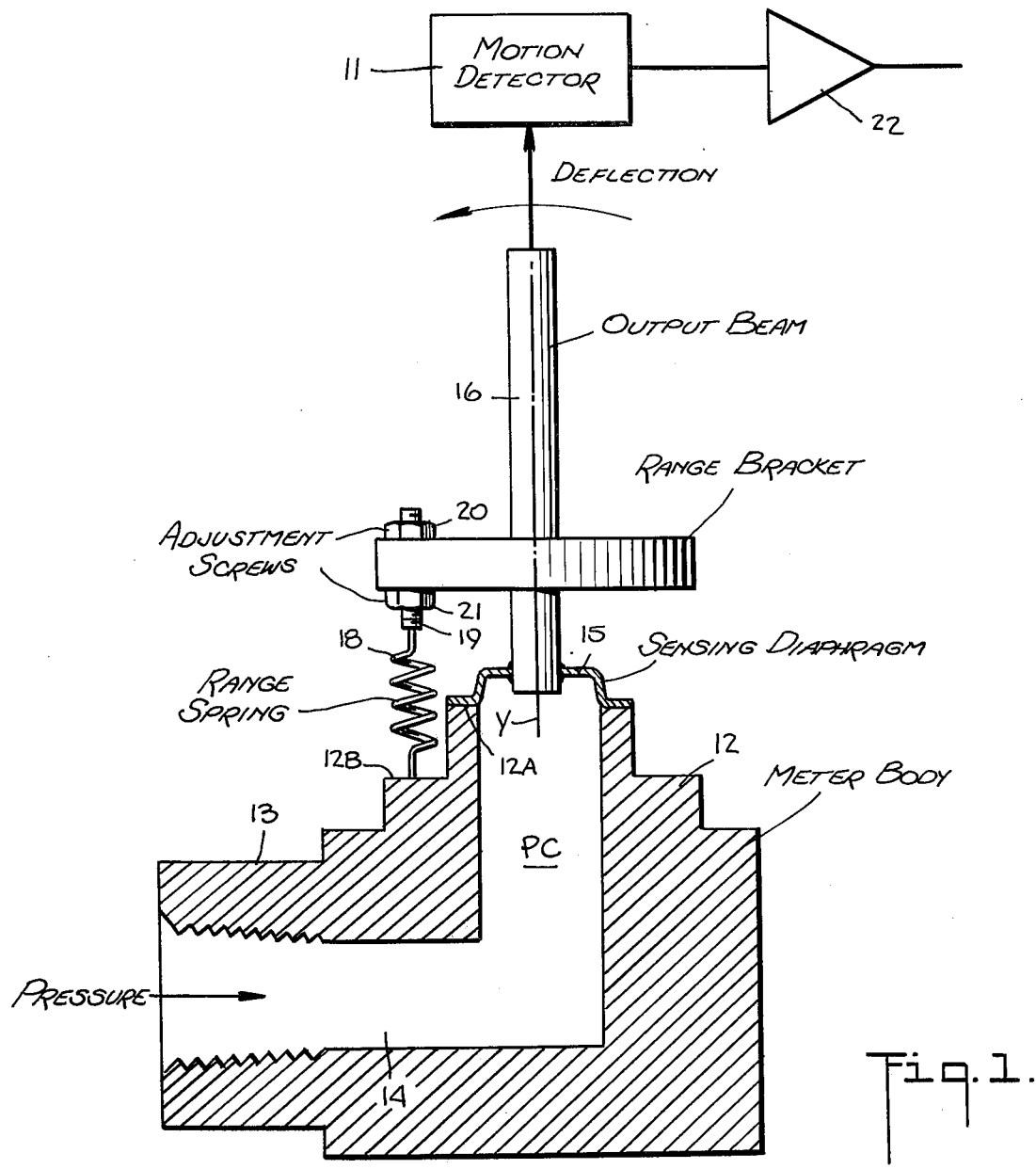
FIG. 1 is a longitudinal sectional view taken through a first embodiment of a pressure sensor in accordance with the invention.
Figure 2:
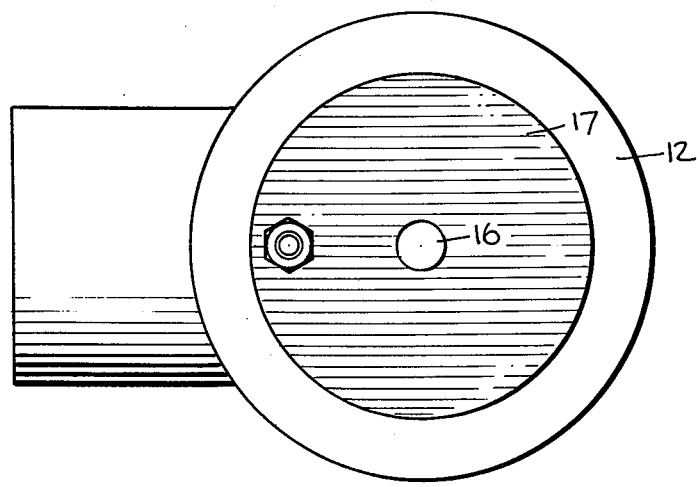
FIG. 2 is a plan view of the sensor shown in FIG. 1.

Referring now to FIGS. 1 and 2, there is shown a pressure transmitter in accordance with the invention, the transmitter including a pressure sensor generally designated by numeral 10, operating in conjunction with a motion detector 11 which converts the reading of the sensor into a corresponding signal for transmission to a remote point.

Sensor 10 acts to meter the pressure of a fluid within a central pressure chamber PC formed within a cylindrical meter body 12 having a stepped formation. Fluid to be supplied to chamber PC is fed thereto through a line (not shown) terminating in a coupling 13 secured to one side of meter body 12. Coupling 13 feeds fluid into a lateral duct 14 communicating with pressure chamber PC.

Chamber PC is sealed at its upper end by a flexible diaphragm 15 that is peripherally welded to the top step 12A of the meter body. In operation, when subjected to fluid pressure, diaphragm 15 is caused to dilate in the axial direction represented by vertical axis Y to an extent proportional to the applied pressure.

Anchored at the center of diaphragm 15 is an upstanding force beam 16 which, in the static state, has its longitudinal axis coincident with vertical axis Y. Beam 16 is pushed upwardly by the expanding diaphragm but moves only slightly along axis Y for reasons to be later explained.

Secured to beam 16 at an intermediate position thereon is an annular bracket 17 which is symmetrically disposed with respect to the beam axis, so that the bracket, per se, gives rise to no tilting force. Connected between one side of bracket 17 and the step 12B directly below top step 12A on the meter body is a helical range spring 18. The upper end of spring 18 is welded to an adjustment screw 19 which passes through a bore in the bracket and is held thereto by nuts 20 and 21.

Range spring 18 is offset with respect to vertical axis Y and acts to constrain axial movement of the force beam 16 along this axis. Hence when diaphragm 15 is caused by the pressure of fluid in chamber PC to expand upwardly, the range spring which resists axial motion of the beam causes the beam to tilt or deflect to an extent indicative of the applied force. By adjusting the gradient of spring 18, the pressure range of the meter can be calibrated to a specified value.

The extent of movement at the upper end of force-beam 16 is a function of the spring rate of the sealing diaphragm 15, as well as the spring rate of range spring 18. Zero suppression bias is mechanically provided by the range spring whose load is adjustable.

The degree of beam deflection is determined by a motion detector 11 which produces a proportional electrical signal that is amplified in an output amplifier 22 to yield a high-level output signal in the usual process control range (i.e., 4 to 20 mA-DC). The motion detector may be of the open-loop type disclosed in the copending Kazahaya application Ser. No. 579,719, entitled "Open Loop Differential Pressure Transmitter" (common assignee). The rebalance torque is developed by a negative feedback loop that includes a detector to sense any slight change in force bar position due to an unbalance of torques. The detector generates a corresponding feedback signal that is directed to a feedback motor. The motor, in turn, applies to the force beam a force in opposition to the input force. This feedback signal is maintained proportional to the pressure being measured and is usable to produce an output signal for transmission to a remote control station or to an indicating or recording device.

In a force-balance instrument of the electrical type, such as that disclosed in U.S. Pat. No. 3,832,618, the feedback system is provided with an electric motor and the output signal is electrical in nature, whereas in the pneumatic type, such as that disclosed in U.S. Pat. No. 3,742,969, the motor is in the form of a pneumatically-actuated bellows and the output signal which is applied to the bellows is fluidic in nature.

In a force-balance transmitter, there is virtually no movement of the force bar over the full-scale range of operation. This virtual absence of movement is highly advantageous, for it effectively eliminates non-linearity and other errors of the type encountered in so-called motion-balance instruments. It is to be understood that the pressure transmitter is not limited to any one form of motion detector, nor is it restricted to an electrical output signal, for in some cases it may be necessary to produce a pneumatic signal as a function of fluidic pressure.

Second Embodiment

The pressure sensor disclosed in FIGS. 1 and 2 is best adapted to work in low pressure ranges and to this end diaphragm 15 is preferably fabricated of a thin, compliant metal. However, this arrangement is not suitable in high pressure ranges, for when the diaphragm is subject to high pressure, it may be expanded beyond its elastic limit and be permanently deformed, thereby impairing the accuracy of the sensor.

To provide a sensor for high pressure operation, use is made, as shown in FIGS. 3 and 4, of a cylindrical meter body 23 having a top section 23A of reduced diameter to define a ledge 23B below the end of the body. The pressure chamber PC extends axially through the entire meter body, the fluid input being through the bottom end of the chamber.

The upper end of the chamber is sealed by diaphragm 15 on which force beam 16 is anchored exactly as in the first embodiment. Deflection of the beam is converted into a signal for transmission in the manner previously described.

In order to prevent permanent deformation of the diaphragm, a holding ring 24 is provided which is seated on and welded to ledge 23B, the ring surrounding meter body section 23A. Ring 24 has the same diameter as the annular bracket 17 secured to beam 16 and is parallel thereto.

Bridging bracket 17 and ring 24 at diametrically-opposed positions are a pair of flat, reinforcing strips or struts 25 and 26. These struts lie in a vertical center-line plane CP which passes through the center of the diaphragm and the longitudinal axis of the beam. Range spring 18' is connected between bracket 17 and ring 24 and is offset with respect to the axis of the beam. In practice this spring may be a flat rather than a helical spring.

When fluid pressure acts to dilate the diaphragm, it seeks to push force beam 16 and the bracket 17 thereon upwardly. However, motion in the direction is limited by struts 25 and 26, for the gradient of these struts in their direction of elongation is very high. And since these struts lie within the center-line plane CP, they allow only axial deflections of the force beam.

Struts 25 and 26 have a relatively low gradient in the deflection direction, that in the direction normal to the flat side of the struts. Hence, these struts do not resist deflection of the force beam as a result of the applied fluidic pressure.

While there has been shown and described embodiments of a pressure transmitter in accordance with the invention, it will be appreciated that many changes and modifications may be made therein without, however, departing from the essential spirit thereof.

We claim:

1. In a pressure transmitter in which fluid pressure is indicated by a sensor to produce a corresponding deflection which is converted into a signal for transmission to a remote station, said sensor comprising:
    A. a meter body having a chamber therein which is coupled to the fluid whose pressure is to be transmitted;
    B. a diaphragm sealing said chamber whereby the diaphragm is caused to dilate axially as a function of applied fluid pressure;
    C. an upstanding force beam anchored on said diaphragm whereby said dilatable diaphragm seeks to push said beam upwardly; and
    D. a range spring which is offset with respect to the axis of said beam and is connected between an intermediate point on the beam and said body whereby when said beam is pushed by said diaphragm, it is caused to deflect.

2. In a pressure transmitter as set forth in claim 1, further including open-loop detecting means responsive to said deflection to produce said signal.

3. In a pressure transmitter as set forth in claim 1, further including closed-loop detection means responsive to said deflection to produce said signal.

4. In a pressure transmitter as set forth in claim 1, wherein said beam is provided with an annular bracket at said intermediate point and said spring is connected to one side of said bracket.

5. In a pressure transmitter as set forth in claim 4, wherein said spring is a helical spring and is connected by an adjustment screw to said bracket to vary the range of said sensor.

6. In a pressure transmitter as set forth in claim 4, a pair of flat struts bridging the body and the bracket at diametrically opposed positions, said struts lying in a central plane intersecting the center of the diaphragm.

7. In a transmitter as set forth in claim 6, wherein said spring is a flat spring.

* * * * *

UNITED STATES PATENT OFFICE
CERTIFICATE OF CORRECTION

Patent No. 4,030,366                Dated  June 21, 1977

Inventor(s) Masahiro Kazahaya and John J. Bonner

It is certified that error appears in the above-identified patent and that said Letters Patent are hereby corrected as shown below:

Column 1, line 45 "mouned" should have read -- mounted --

Column 4, line 20 "in" should have read -- is --

Signed and Sealed this

Twenty-fifth Day of October 1977

[SEAL]

Attest:

RUTH C. MASON          LUTRELLE F. PARKER
Attesting Officer      Acting Commissioner of Patents and Trademarks